UNITED STATES PATENT OFFICE.

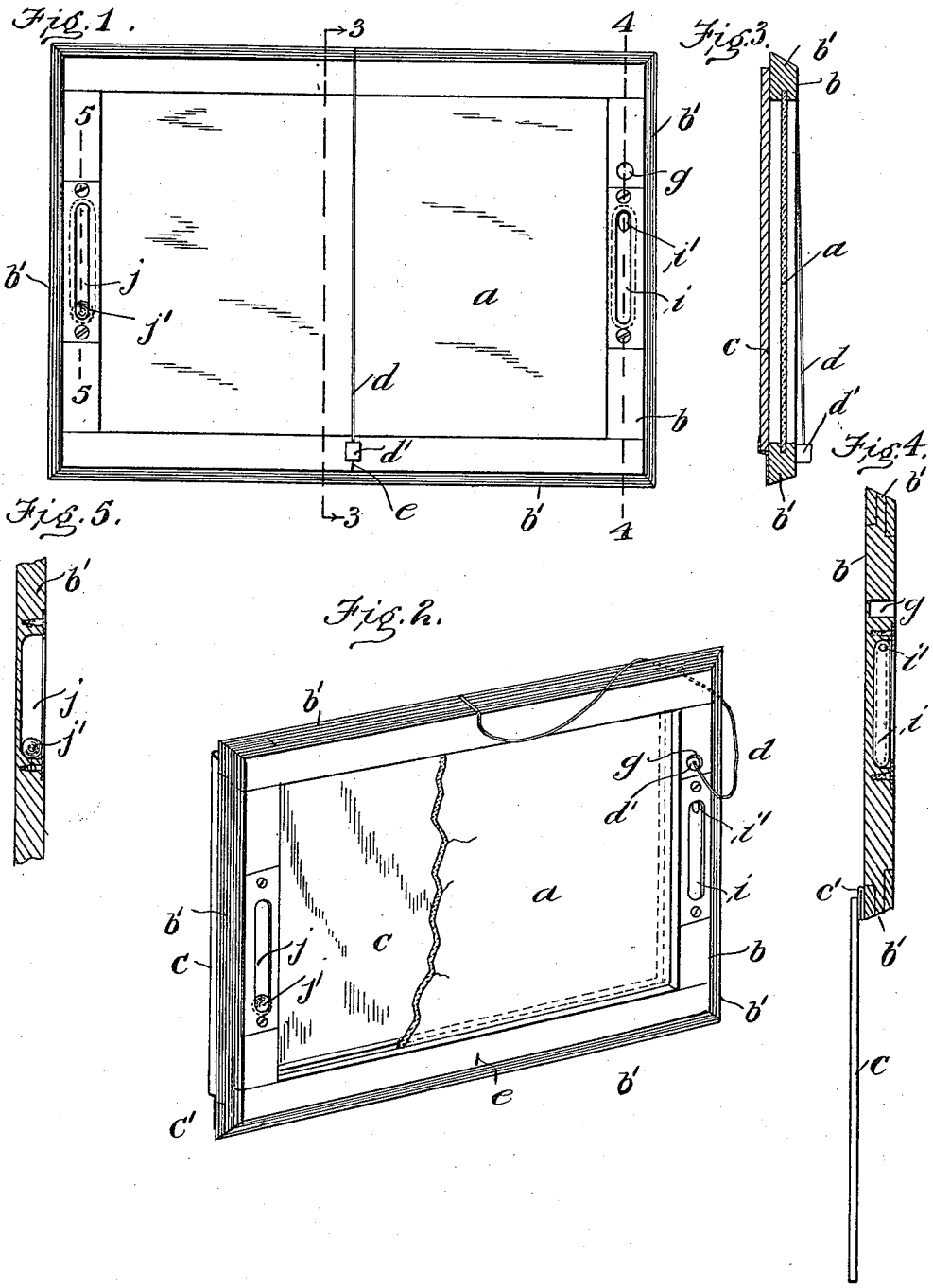

ANSON K. CROSS, OF WINTHROP, MASSACHUSETTS.

DRAWING-TABLET.

1,041,435. Specification of Letters Patent. Patented Oct. 15, 1912.

Application filed February 28, 1910. Serial No. 546,418.

*To all whom it may concern:*

Be it known that I, ANSON K. CROSS, of Winthrop, in the county of Suffolk and State of Massachusetts, have invented certain new and useful Improvements in Drawing-Tablets, of which the following is a specification.

Power to see nature truly is generally gained only by the expenditure of years of time devoted to the arts of drawing and painting. It is so difficult to see even form correctly that many of the best known artists find they are more hindered in their work by not being able to draw quickly and accurately than by any other problems.

In the public and all elementary schools where the drawing lessons must be given to a large number of pupils in a short period, it is practically impossible to make drawings from objects and then enable the students to realize where they are faulty. Freehand drawing is thus a most difficult subject to teach and the time devoted to it is often spent in simply copying, or in dictation work, or in problems which are more related to manual training than to pictorial drawing.

My invention is embodied in a transparent tablet adapted to be held and marked upon like an ordinary school slate, and is the result of an effort to make the elementary student in freehand drawing independent of a teacher and able to correct his own drawings.

A perspective drawing is such a drawing that if it is made upon a pane of glass and held in front of the object and looked at from the right point it will appear to cover the object.

It follows that if the student can make his drawing upon a sheet of glass just as he would make it upon a sheet of paper, he will be able to hold it between his eye and the object, and if the drawing is not too large and is correct, some position will be found for the sheet of glass in which the drawing upon it will appear to exactly cover the object. If the drawing cannot be made to appear to perfectly cover all parts of the object, it is evident that the drawing is not correct and so the drawing proves to the student where he has failed and enables him to advance much more rapidly than would be possible if he were drawing on paper.

Of the accompanying drawings, forming a part of this specification,—Figure 1 represents a side elevation of a drawing tablet embodying my invention. Fig. 2 represents a perspective view of the same, a part of the glass being broken away. Fig. 3 represents a section on line 3—3 of Fig. 1. Fig. 4 represents a section on line 4—4 of Fig. 1, the hinged opaque back being displaced. Fig. 5 represents a section on line 5—5 of Fig. 1.

The same reference characters indicate the same parts in all the figures.

My improved tablet consists of a pane $a$ of glass held in a frame $b$ whose edges $b'$ are beveled equally all around the front side of the frame, the beveled edges being a different color from the rest of the frame. The edges are beveled to assist the student to hold the glass at right angles to a line from his eye to the center of the glass, which position is necessary for correctly testing the drawing. When the glass is held before the object to test the drawing upon it, the student closes one eye and holds the frame so that the opposite beveled edges appear of equal width. When thus seen the glass must be at right angles to the direction in which the student sees the object. A few experiments will quickly prove that the glass must be at right angles to a line from the eye to the center of the glass, both when making and when testing the drawing.

The student who does not realize that a true picture of the object can be obtained only upon a sheet of glass that is held at right angles to the direction in which it is seen, should prove this point before going farther by obtaining a rubber ball (the larger the better), placing it near him, and below his eye he should draw it upon the glass and test the drawing by holding it in front of the sphere when the glass is at right angles to the central line of sight and also when its surface is seen obliquely and thus foreshortened. These drawings will prove to the student that when the surface of the glass is foreshortened any form upon it will be foreshortened (whether it is being drawn or tested) and so the drawing can neither appear of its real shape nor be tested for truth.

A white cardboard flap $c$ is hinged at $c'$ to one edge of the frame so that the glass will appear like a sheet of white paper when the cardboard is behind the glass and thus permit a drawing to be made upon the glass just as it would be made upon paper, a suitable medium being employed adapted to make lines on the glass.

To the center of the edge of the frame opposite the hinged edge of the flap is attached a plumb line $d$. A weight $d'$, which is preferably a small cylinder of metal through which the cord passes, is free to roll upon the lower edge of the frame when the tablet is held before an object which is below the level of the student's eyes. The center of the lower edge of the frame has a mark $e$ printed on the frame and when the frame is held before the object for testing, it should be so held that the plumb line covers or rests on the said mark. Thus held, the upper and lower edges of the frame must be level. If the tablet is held above the eye to test the appearance of any object, the upper edge of the frame will project in front of the lower edge, and the plumb line if used will hang some distance in front of the central mark upon the lower edge of the frame.

Objects above the eye level may be tested by leveling the shorter edges or end members of the frame by the means provided in these shorter members, as hereinafter described.

When the drawing is to be made upon the tablet, the plumb line can be secured so that it will not interfere with the drawing by inserting the weight in a hole $g$ bored in the frame and adapted to receive the weight.

Pupils old enough to use the tablet but not the plumb line will nevertheless gain the principal value of the work upon the glass, for the variations from the exact position of the tablet required for testing, which may occur with the very young pupil who omits the use of the plumb line, will not prevent him from making rapid progress in the art of seeing, if he draws without measuring or testing or tracing, and tries to hold the glass at right angles to the direction in which he looks and with its upper edge level.

When the tablet is held before the object to test the drawing, the student should sit or stand directly facing the object, hold the tablet with both hands, and stretch the arms out equally. This naturally brings the tablet into a position at right angles to the central line of sight. If the plumb line is not used, he should look at the frame of the tablet alone at first to determine when its upper and lower edges are perfectly level. If he does not do this, the lines of the objects behind the glass will mislead the student as to the position of horizontal and the frame will be held more or less inclined.

The essential directions for correctly using the glass may be printed upon the flap of the glass. When used, the tablet should be held in the left hand as far as possible from the eye with the edge to which the flap is fastened at the bottom. It is also necessary to hold it so that its surface will be at right angles to a line from the eye to the center of the glass as already explained.

The object to be studied at the first lesson may be the top of a circular table. If this is not at hand, a tub or barrel may be used. The student should sit in a chair a few feet away from the object. When properly placed, let the student draw upon the glass a picture of the top of the object, making it about four or five inches wide and as high proportionally as the object appears when the apparent height is compared with its apparent width. It is necessary to hold the glass so that its surface is perpendicular to a line from the eye to the center of the glass. And its upper and lower edges must be perfectly level both when drawing on the glass and when testing the drawing. The tablet should always be held with the hinged edge of the flap at the bottom, so that the flap will fall from the glass when the hand is removed from the flap.

The chief value of the transparent tablet lies in the power of seeing proportions and angles correctly to be gained by its use. These can be represented as truly by the slightest touches as by a highly finished drawing. The student should always put down his impressions of the apparent form frankly and not attempt to test the drawing in any way until his eyes can detect no error in it. When the drawing seems correct, let him test it by holding it very carefully in front of the object and if it proves incorrect, he will be benefited much more than he would be had he gained the correct form approximately by means of measurements or tests applied before making the drawing.

When the picture on the glass of the object drawn appears correct, the student must test it by holding the glass as explained. If the drawing is not too large, and the object is a circular table top, a position will be found in which the width of the drawing appears to cover the width of the table top, and if the drawing is correct, its height will now appear the same as that of the table top. If the height is not the same and the line on the glass does not cover the edge of the table, the difference between the drawing and the real appearance is seen at once by even the untrained pupil.

After having made a correct drawing of the top of the table, the student should move the table or himself and try again and again, until able to draw the ellipse which represents the circle with a true curve which before testing the first time proves to be the exact appearance. After the round table a square or rectangular table top may be drawn and after this the tops of any boxes, barrels, pails, large pans, waste-baskets, pots, etc. All these objects should be placed near enough the eye for the drawing to be as large as is possible to be tested when the glass is held at just a little less than full arm's length from the eye.

After gaining ability to represent the top of any object the pupil may represent the entire object, always drawing the whole of it by eye and changing the drawing by eye alone as long as this can be done, and only when the drawing seems perfect is the flap to be allowed to fall back and the drawing tested.

When able to tell the truth about common objects below the eye, they should be placed above the eye level, and on the eye level and they should be turned so as to present all possible appearances from all these levels. The end members of the frame *b* are adapted to serve as levels, one of said members having a glass tube *i* containing liquid, and an air bubble *i'*, while the other member has a cavity *j* in which a ball *j'* is adapted to roll. Either of these levels may be used, the other being omitted.

I claim:

1. A transparent tablet for use in the study of free-hand drawing, having means for determining when one of its edges is horizontal.

2. A transparent tablet for use in the study of free-hand drawing, said tablet having a rectangular frame, and means for determining when the upper and lower edges of the frame are horizontal.

3. A transparent tablet for use in the study of free-hand drawing, having a rectangular frame provided with beveled edges, and means whereby a horizontal position of two of the edges of the frame may be determined.

4. A transparent tablet for use in the study of free-hand drawing, having a rectangular frame provided with beveled and colored edges, the beveling of said edges being equal.

5. The combination with a frame, of a sheet of transparent material having a surface adapted to be marked upon, and having means for determining when the upper and lower edges of the frame are horizontal.

6. The combination with a rectangular frame, of a sheet of transparent material adapted to receive markings, and having a plumb line, said plumb line being attached to one of the side members of the frame and having a length to reach across the transparent material to the opposite side member of the frame, the weight being supported by the cord to coact with said opposite side member.

7. The combination with a rectangular frame, of a sheet of transparent material adapted to receive markings, and having a plumb line, said plumb line being attached to one of the side members of the frame and having a length to reach across the transparent material to the opposite side member of the frame, the weight being supported by the cord to coact with said opposite side member, the latter having a mark to coact with said weight to indicate when the top and bottom are horizontal.

8. The combination with a frame, of a sheet of transparent material adapted to receive markings, said frame having a socket or recess, and a flexible cord attached at one end to the frame, and having a weight at the other end, said weight being adapted to be placed in said socket or recess when not in use.

9. The combination with a frame, of a sheet of transparent material adapted to receive markings, and a leveling device carried by said frame.

In testimony whereof I have affixed my signature, in presence of two witnesses.

ANSON K. CROSS.

Witnesses:
C. F. BROWN,
P. W. PEZZETTI.

---

Copies of this patent may be obtained for five cents each, by addressing the "Commissioner of Patents, Washington, D. C."